(12) United States Patent
Kuo et al.

(10) Patent No.: US 8,214,895 B2
(45) Date of Patent: Jul. 3, 2012

(54) WHITELIST AND BLACKLIST IDENTIFICATION DATA

(75) Inventors: Chengi Jimmy Kuo, Manhattan Beach, CA (US); Jigar J. Mody, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 11/861,489

(22) Filed: Sep. 26, 2007

(65) Prior Publication Data

US 2009/0083852 A1 Mar. 26, 2009

(51) Int. Cl.
*H04L 29/06* (2006.01)

(52) U.S. Cl. .............. 726/22; 726/23; 726/24; 707/736; 707/758; 713/188

(58) Field of Classification Search .............. 726/22, 726/23, 24; 707/736, 758; 713/188
See application file for complete search history.

(56) References Cited

U.S. PATENT DOCUMENTS

| | | | |
|---|---|---|---|
| 6,748,534 B1 * | 6/2004 | Gryaznov et al. ............. | 713/188 |
| 7,080,000 B1 | 7/2006 | Cambridge | |
| 7,231,440 B1 | 6/2007 | Kouznetsov et al. | |
| 7,543,146 B1 * | 6/2009 | Karandikar et al. .......... | 713/175 |
| 7,930,400 B1 * | 4/2011 | Fox et al. ....................... | 709/226 |
| 2002/0042886 A1 * | 4/2002 | Lahti et al. ..................... | 713/201 |
| 2003/0023866 A1 | 1/2003 | Hinchliffe et al. | |
| 2003/0149888 A1 * | 8/2003 | Yadav ............................ | 713/200 |
| 2003/0172291 A1 * | 9/2003 | Judge et al. ................... | 713/200 |
| 2003/0212791 A1 * | 11/2003 | Pickup ........................... | 709/225 |
| 2004/0068663 A1 | 4/2004 | Sobel | |
| 2004/0083384 A1 | 4/2004 | Hypponen | |
| 2005/0080855 A1 * | 4/2005 | Murray .......................... | 709/206 |
| 2006/0021032 A1 * | 1/2006 | Challener et al. .............. | 726/22 |
| 2006/0143713 A1 | 6/2006 | Challener et al. | |
| 2006/0150256 A1 * | 7/2006 | Fanton et al. .................... | 726/27 |
| 2006/0174344 A1 | 8/2006 | Costea et al. | |
| 2006/0191011 A1 | 8/2006 | Korkishko et al. | |
| 2006/0242686 A1 | 10/2006 | Toda et al. | |
| 2006/0294589 A1 * | 12/2006 | Achanta et al. .................. | 726/24 |
| 2007/0028304 A1 * | 2/2007 | Brennan ........................ | 726/24 |
| 2007/0094539 A1 | 4/2007 | Nakatsuka et al. | |
| 2007/0156895 A1 | 7/2007 | Vuong | |
| 2008/0016339 A1 * | 1/2008 | Shukla ........................... | 713/164 |

(Continued)

FOREIGN PATENT DOCUMENTS

EP 1657662 A2 5/2006

(Continued)

OTHER PUBLICATIONS

International Search Report and Written Opinion Received for PCT Application No. PCT/US2008/077946, mailed on Mar. 31, 2009, 13 pages.

(Continued)

*Primary Examiner* — Nathan Flynn
*Assistant Examiner* — Sarah Su (57) ABSTRACT

Aspects of the subject matter described herein relate to identifying good files and malware based on whitelists and blacklists. In aspects, a node starts a scan of files on a data store. In conjunction with starting the scan, the node creates a data structure that indicates the directories on the data store. The node sends the data structure to a whitelist server and a blacklist server and an indication of a last successful time of communication. The whitelist and blacklist servers respond to the node with information about any new files that have been added to the directories since the last successful communication. The node may subsequently use the information to identify known good files and malware.

9 Claims, 6 Drawing Sheets

U.S. PATENT DOCUMENTS

| | | | |
|---|---|---|---|
| 2008/0104186 A1* | 5/2008 | Wieneke et al. | 709/206 |
| 2009/0029693 A1* | 1/2009 | Liwell et al. | 455/419 |
| 2010/0251256 A1* | 9/2010 | Soules et al. | 718/105 |

FOREIGN PATENT DOCUMENTS

| | | | |
|---|---|---|---|
| KR | 10-2007-0021878 A | | 2/2007 |
| WO | WO 2006014554 A2 | * | 2/2006 |
| WO | WO2006101549 A2 | | 9/2006 |
| WO | WO2007/123492 A1 | * | 11/2007 |

OTHER PUBLICATIONS

Hansen et al., "Developing a Legally Compliant Reachability Management System as a Countermeasure against SPIT1", Third Annual VoIP Security Workshop, Jun. 2006, pp. 1-7.

Liston, "Antimalware/Client Firewall", retrieved at <<http://searchsecurity.techtarget.com/magazineFeature/0,296894, sid14_gci1257275,00.html, Oct. 2006, pp. 1-3.

* cited by examiner

WHITELIST AND BLACKLIST IDENTIFICATION DATA

BACKGROUND

In one sense, malware includes unwanted software that is installed on a computer. Malware may be hostile, intrusive, or annoying. It may be designed to infiltrate or damage a computer system without the owner's informed consent. Malware can be relatively benign or severely disruptive. Some malware can spread from computer to computer via networks or the use of removable computer-readable media. Some malware attempts to remain hidden from user inspection while other malware becomes obvious immediately.

The number of malware continues to grow at a phenomenal rate. Vendors that produce malware detection and removal products are continually updating the list of malware their products can detect and remove. Guarding against malware is an ongoing challenge.

SUMMARY

Briefly, aspects of the subject matter described herein relate to identifying good files and malware based on whitelists and blacklists. In aspects, a node starts a scan of files on a data store. In conjunction with starting the scan, the node creates a data structure that indicates the directories on the data store. The node sends the data structure to a whitelist server and a blacklist server and an indication of a last successful time of communication. The whitelist and blacklist servers respond to the node with information about any new files that have been added to the directories since the last successful communication. The node may subsequently use the information to identify known good files and malware.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
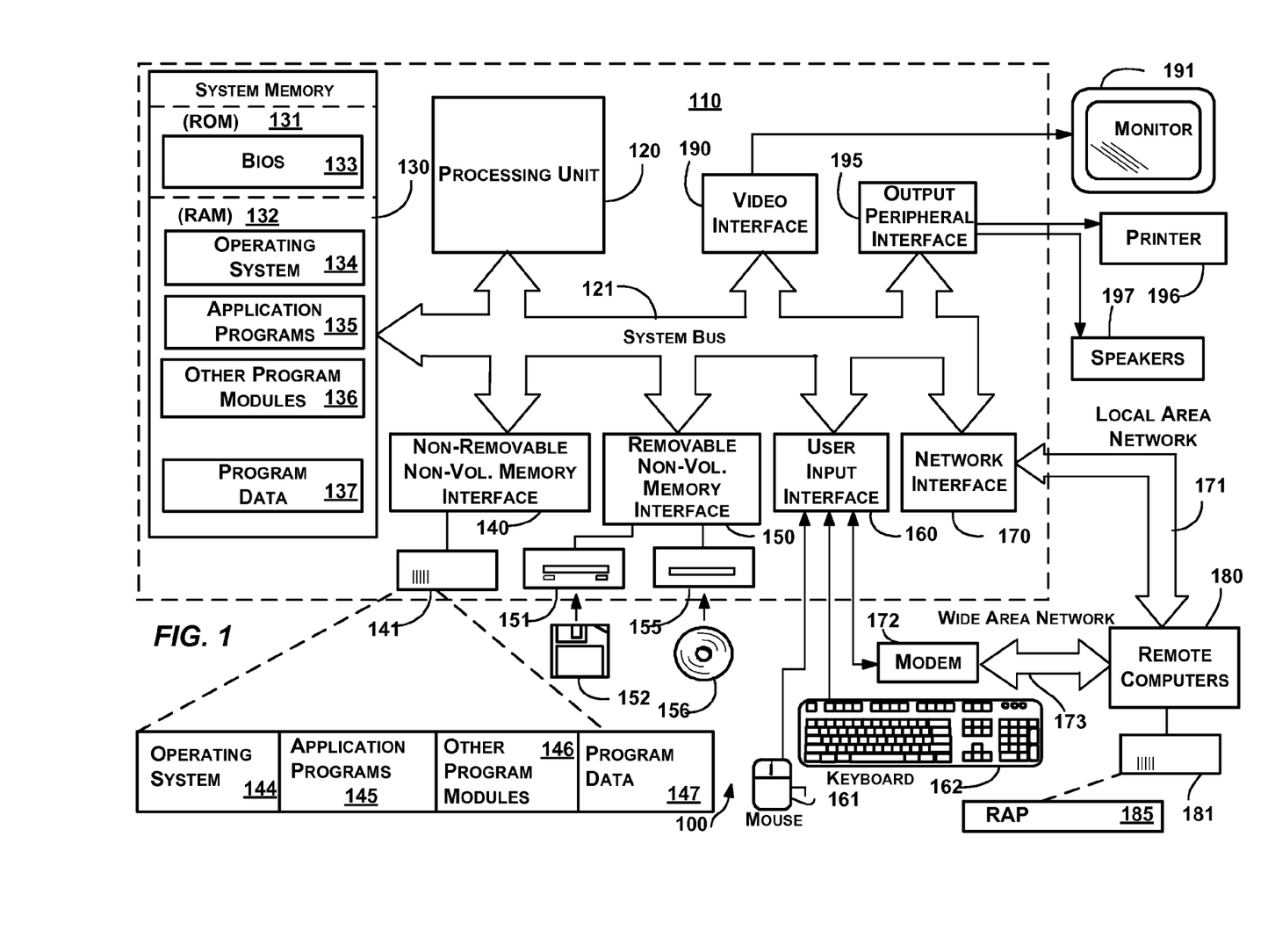
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Malware Identification Data

As mentioned previously, malware is a significant problem to computer systems. In one embodiment, malware may include computer viruses, worms, Trojan horses, spyware, unwanted adware, other malicious or unwanted software, and the like. In another embodiment, malware may include software that presents material that is considered to be obscene, lewd, lascivious, filthy, excessively violent, harassing, or otherwise objectionable.

What is designated as good and what is designated as malware may differ from individual to individual and from organization to organization. For example, one organization may consider a chat program that allows communication with others via the Internet as a good program while another organization may consider the chat program as malware. The designation of good or malware may be indicated through the use of a whitelist and blacklist as described in more detail below. As will be recognized, files may be designated as good or malware in a variety of ways without departing from the spirit or scope of aspects of the subject matter described herein.

Malware may be identified in a variety of ways. In one embodiment, databases that identify clean files and bad files (e.g., files that include malware) may be maintained. Files that are designated as good are sometimes referred to as whitelist files or being on a whitelist while files that are designated as malware are sometimes referred to as blacklist files or being on a blacklist. When a company creates a new version of software, the files included in the software may be added to a whitelist. When a file is identified as being malware, the file may be added to the blacklist.

Figure 2:
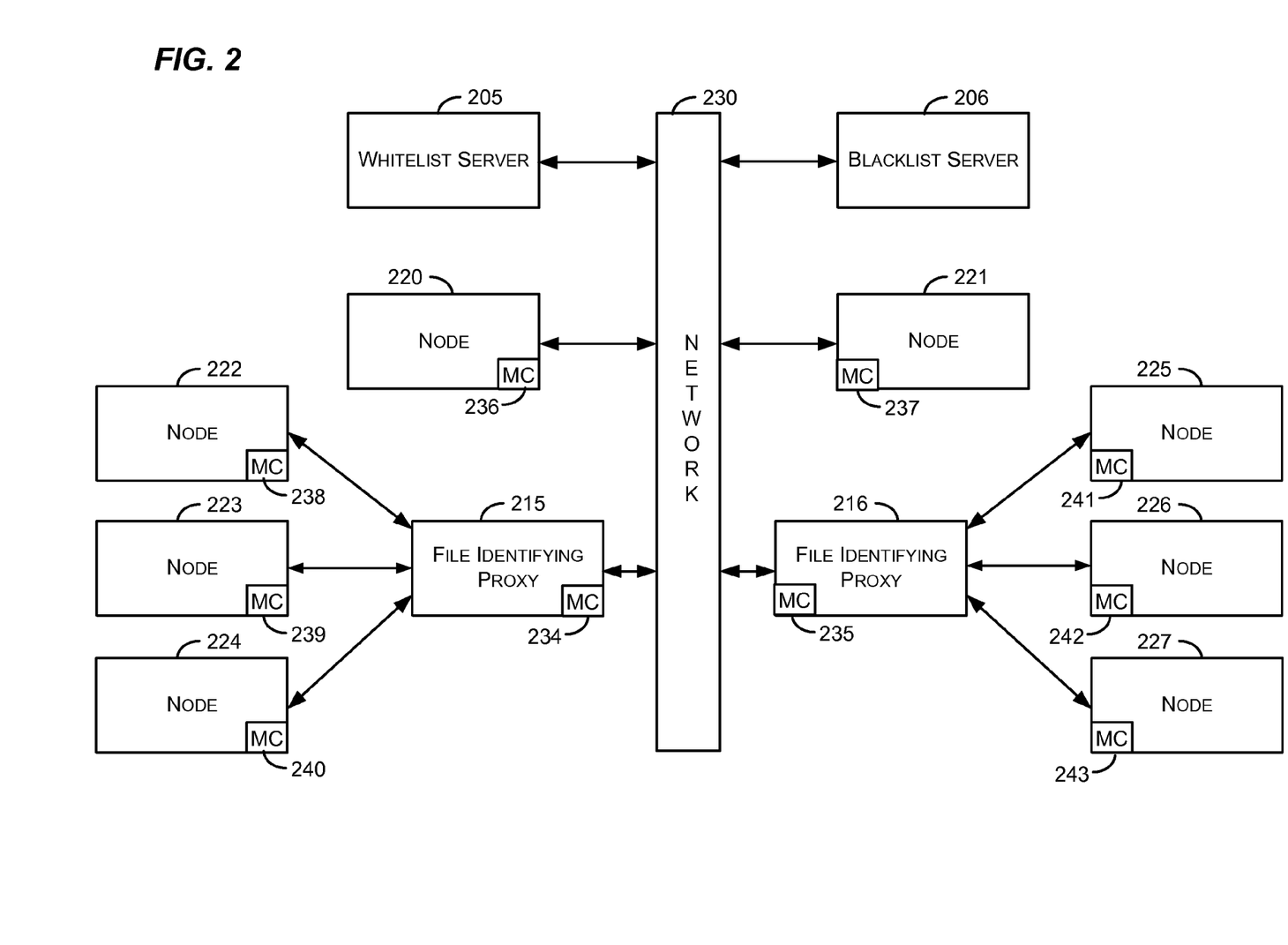
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a whitelist server 205, a blacklist server 206, file identifying proxies 215-216, nodes 220-227, and a network 230 and may include other entities (not shown). The various entities may communicate with each other via various networks including intra- and inter-office networks and the network 230. In an embodiment, the network 230 may comprise the Internet. In an embodiment, the network 230 may comprise one or more private networks, virtual private networks, and the like.

Each of the servers 205 and 206, the file identifying proxies 215-216, and the nodes 220-227 may be implemented on or as one or more computers (e.g., the computer 110 as described in conjunction with FIG. 1). The nodes 222-224 includes nodes that use the file identifying proxy 215 to identify good and bad files while the nodes 225-227 includes nodes that use the file identifying proxy 216 to identify good and bad files. The nodes 220-221 may identify malware using the malware components 236-237, respectively.

The whitelist server 205 includes information about files that are designated as good. This information may include the name of the file, a hash of the file, the directory in which the file is installed, the package or software product to which the file belongs, the vendor producing the file, the date the file was identified as being on the whitelist, the version of the file, other information about the file, and the like. In one embodiment, a file identified in the whitelist may only be considered a "good" file on a particular node if the file is found in the proper directory. For example, if the whitelist indicates that the file FILE1 is located in the directory DIR1 and a node finds the file FILE1 in a directory DIR2, the FILE1 in DIR2 is not designated as a good file based on the whitelist.

Similarly, the blacklist server 206 includes information about files that are designated as malware. This information may include the name of the file, a hash of the file, the directory in which the file is installed, the date the file was identified as malware, the version of the file, other information about the file, and the like. In one embodiment, a file identified in the blacklist may be considered malware if the file is found in the directory indicated by the blacklist server 206. In another embodiment, the file identified in the blacklist may be considered malware if the file is found in any directory.

In operation, a node attempting to determine whether a file may include malware may first create a data structure that includes the directories found on the node. The data structure may indicate the hierarchy of the directories as well as date and timestamp for the creation of each directory. The node may then send this data structure to the whitelist server 205 and the blacklist server 206 together with times of last successful communication with each server. If the node desires to receive a full list, the node may omit the time of last successful communication with a server. The whitelist server 205 may respond with file information regarding whitelist files that may be found in the directories indicated by the node. Similarly, the blacklist server 206 may respond with file information regarding blacklist files that may be found in the directories indicated by the node. In one embodiment, the whitelist and blacklist servers 205 and 206 may respond with those files that have been added to the directories indicated since the last successful communication with the node and/or all the files of any newly added directories since the last successful communication.

The information included in a whitelist or blacklist for a particular directory may be a union of all good or bad files that might reside in the directory. For example, an operating system may come in a variety of configurations that uses a similar directory structure but where some of the files may be different in content and/or name. A whitelist for a particular directory may include the union of all good files from each of the installations that may be installed in the directory.

In one embodiment, the servers 205-206 do not send instructions to delete information that may exist on a whitelist or blacklist database of a particular node unless the information is erroneous. For example, just because a printer driver is updated does not necessarily mean that the old printer driver should be deleted from a whitelist. On the other hand, in another embodiment, if a file that is on a whitelist is later determined to be bad, the whitelist server 205 may send instructions to delete the information associated with the file from a whitelist maintained on the node while the blacklist server 206 may send instructions to add the file to a blacklist maintained on the node.

After the node has received the response from the servers 205-206, the node may determine whether a file is a designated good or malware file by computing a hash of the file and comparing the hash with the hashes returned by the servers 205-206. If the hash of the file is equal to the hash of a whitelist file and the file is found in the appropriate directory, the file may be determined to be good. If the hash is equal to the hash of a blacklist file and the file is found in the appropriate directory, the file may be determined to be malware. If the hash of the file is not found in the whitelist or the blacklist or the file is not found in the appropriate directory, the file may be scanned for any designated malware. Note that scanning may also proceed on files while a node waits for whitelist and blacklist information from the servers 205-206

After a node receives whitelist and blacklist information, the node may add this information to a local database. This local database may be persisted on the node. Updates from the whitelist server 205 and the blacklist server 206 may be added to this database. The node may query the local database in determining whether each file is good or bad. If the database does not include any information about a file, the file may be scanned using traditional methods to determine if it is malware.

Nodes may also send information to the servers 205-206. This information may be sent when requested by a server, after consulting a user, without consulting a user with prior permission granted for such action, and the like. For example, if a node finds a directory that is not included in a whitelist or blacklist, the node may send information about the directory and the files included in the directory to the whitelist and/or blacklist servers. In one embodiment, this information may include the names of the directory and files and hashes corresponding to the files. In another embodiment, the entire contents of each new file may be sent to the server. If the node scans the directory, information obtained during the scan may also be sent to the servers.

The information about a directory may be sent upon request from a whitelist or blacklist server. For example, rather than sending the information with each request, a node may wait to receive a request for the information. In another embodiment, the information may be sent automatically if the node becomes aware that the whitelist or blacklist server did not send any information about files in the directory.

If a sufficient number of nodes send a request for information about a directory to a server, the server may request information about the files from a node, add the directory and files to its database as being good or bad as appropriate. The number of nodes that is determined to be sufficient may be configurable as a threshold. The process of deciding whether to add the files to a database may be manual, semi-automatic, or fully automatic. For example, a person may review new directories of files to determine whether they are to be added to a database. As another example, a directory and its files may be added to a whitelist server's database if the whitelist server receives information about the directory and its files from 100 nodes and each node indicates that the files include no designated malware.

In one embodiment, certified software vendors may be allowed to directly submit data to a whitelist server to be added to a whitelist. For example, when a software vendor releases a new version of a product, the software vendor may submit data about files and directories in the new version to a whitelist server to be added to a whitelist. Before receiving the data, the whitelist server may authenticate the entity and determine whether the entity is authorized to update the whitelist.

A whitelist on a whitelist server may be "seeded" with information about a set of files that are designated as good. The database may then "grow" as a sufficient number of nodes send requests/information regarding directories that are not in the whitelist database.

In one embodiment, software products may include information that identifies files installed with the software as being in a whitelist. When the software is installed, the software installer may add the whitelist information to the node's local whitelist database. In another embodiment, however, a scanner may only trust whitelist information it receives from a trusted whitelist server. This may be verified via a certificate authority, for example.

Although as illustrated in FIG. 2, the whitelist server 205 and the blacklist server 206 are in two different locations, in other embodiments, the whitelist server 205 and the blacklist server 206 may reside on a single physical machine or may each be distributed over several physical machines. In other embodiments, multiple instances of the whitelist server 205 and the blacklist server 206 may be distributed on one or more physical machines.

In some embodiments, a node may query multiple whitelist and/or blacklist servers to obtain information about files. For example, each whitelist and/or blacklist servers may include information about files in certain directories while not including information about other directories. For example, various vendors may have whitelists that corresponds to a products the vendors produce. The node may query multiple servers hosting the whitelists to obtain file information.

Furthermore, a whitelist or blacklist server may be an integration server that collects file information from other servers. For example, vendors may maintain their own information about good files and/or bad files related to their products. A whitelist server may obtain this information from one or more vendor servers and add it to the whitelist server database. As additional information becomes available from the vendors, the whitelist server may add this additional information to its database. Similarly, the blacklist server may obtain and update its database based on information available at vendor databases.

The file identifying proxy 215 may comprise a node that communicates with the servers 205 and 206 in proxy for the nodes 222-224. For example, a corporation may have a set of machines that are very similar or identical with respect to one or more directories and the files contained therein. To avoid having each of the machines talk to the servers 205-206, the company may configure the file identifying proxy 215 to communicate with the servers 205-206 and to obtain the whitelist and blacklist that is a superset of that needed by the nodes 222-224. The file identifying proxy 215 may then respond to queries from the nodes 222-224 for updates to the whitelists and blacklists contained thereon. Alternatively, the file identifying proxy 215 may push updates to the whitelists and blacklists to the nodes 222-224.

As yet another alternative, the file identifying proxy 215 may store the whitelists and blacklists (or a superset thereof) and not have the nodes 222-224 store them. Then, each time a node needs to know whether a file is on a whitelist or blacklist, the node may query the file identifying proxy 215 and provide a hash of the file and the directory in which the file resides to the file identifying proxy 215. The file identifying proxy 215 may respond by informing the node that the file is on a whitelist or blacklist or that the file is not included on a whitelist or blacklist.

The malware identifying components 234-237 include components to interact with the servers 205-207. The malware identifying components 234 and 235 may include additional components to interact with the malware identifying components 238-243. The malware identifying components 238-243 may include components to interact with the malware identifying components 234 and 235. Some exemplary malware identifying components are described in more detail in conjunction with FIG. 3.

Although the environment described above includes two servers, two proxies, and nodes in various configurations, it will be recognized that more, fewer, or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
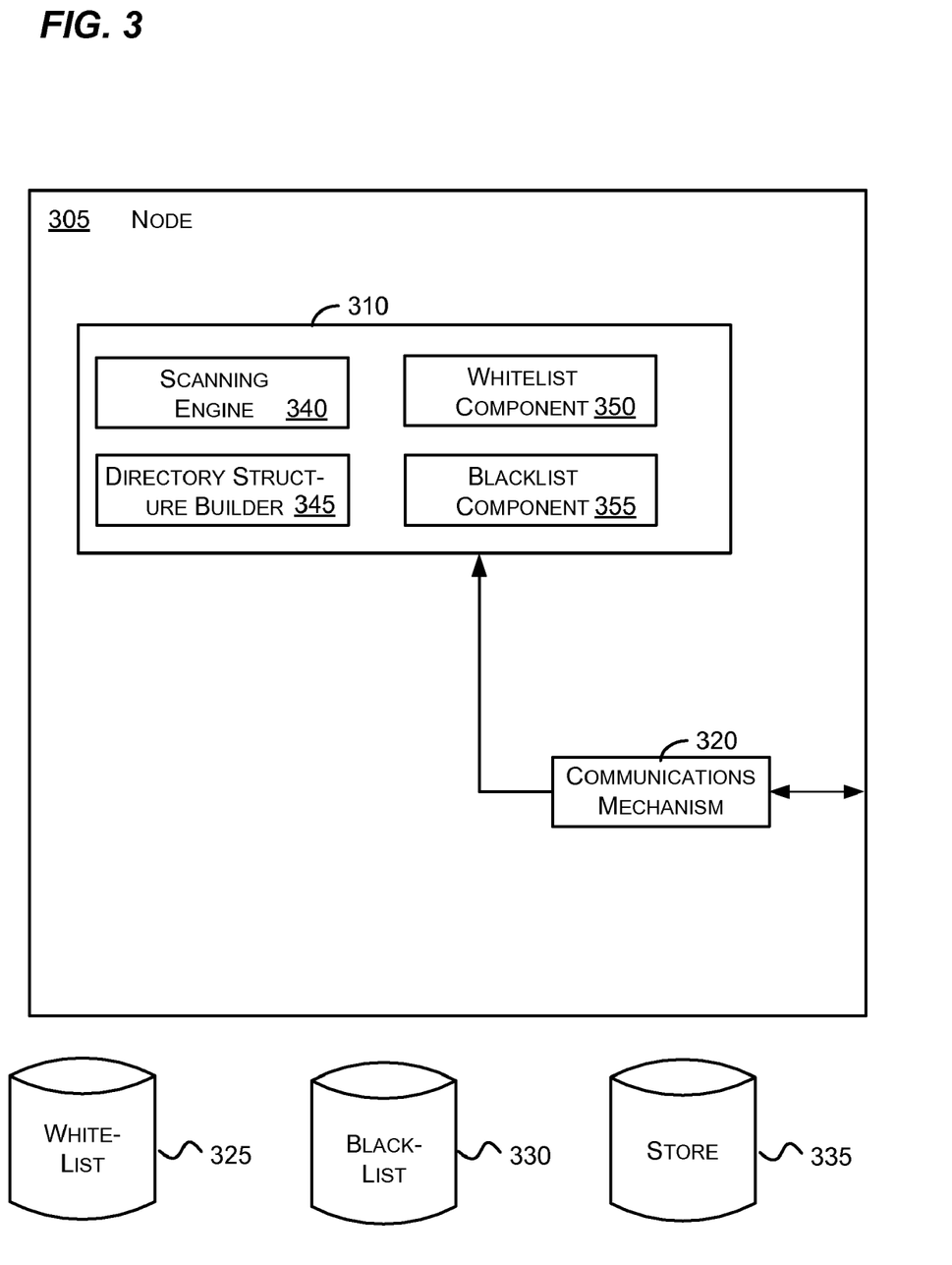
FIG. 3 is a block diagrams that include various components of a node configured according to aspects of the subject matter described herein.

FIG. 3 is a block diagrams that include various components of a node configured according to aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein.

Turning to FIG. 3, the node 305 includes malware identifying components 310, a communications mechanism 320, and three data stores 325, 330, 335. The malware identifying components 310 include a scanning engine 340, a directory structure builder 345, a whitelist component 350, and a blacklist component 355.

The communications mechanism 320 allows the content node to communicate with a whitelist server, blacklist server, and/or proxy. The communications mechanism may send a request for information about a directory and receive a response thereto. The communications mechanism 320 may comprise a network interface or adapter 170, modem 172, or any other mechanism for establishing communications as described in conjunction with FIG. 1.

The scanning engine 340 is a component that is capable of scanning files on the store 335. The scanning engine 340 may utilize information in the whitelist store 325 or the blacklist store 330 to identify a file as good or malware. If there is no information about a file in either list, the scanning engine 340 may attempt to determine whether a file includes any designated malware using traditional methods. More details about the actions taken by the scanning engine 340 are described in conjunction with FIGS. 4 and 5.

The directory structure builder 345 is operable to create a directory structure that includes a hierarchy of one or more directories included on the store 335. The directory structure may then be sent to a whitelist or blacklist server.

The whitelist component 350 is operable to send requests to one or more whitelist servers or to a proxy and to receive responses thereto. When the whitelist component 350 receives a response from a whitelist server, the whitelist component 350 may add information about new files to the whitelist store 325.

Similarly, the blacklist component 355 is operable to send requests to one or more blacklist servers or to a proxy and to receive responses thereto. When the blacklist component 350 receives a response from a blacklist server, the blacklist component 350 may add information about new files to the blacklist store 330.

The stores 325-335 are any storage media capable of storing data. The term data is to be read to include information, program code, program state, program data, and the like. The store 325-335 may comprise a file system, database, volatile memory such as RAM, other storage, some combination of the above, and the like and may be distributed across multiple devices. The store 325-335 may be external or internal to the node 305. Also, although the stores are showed as being separate, in another embodiment, two or more of them may be combined.

Figure 4:
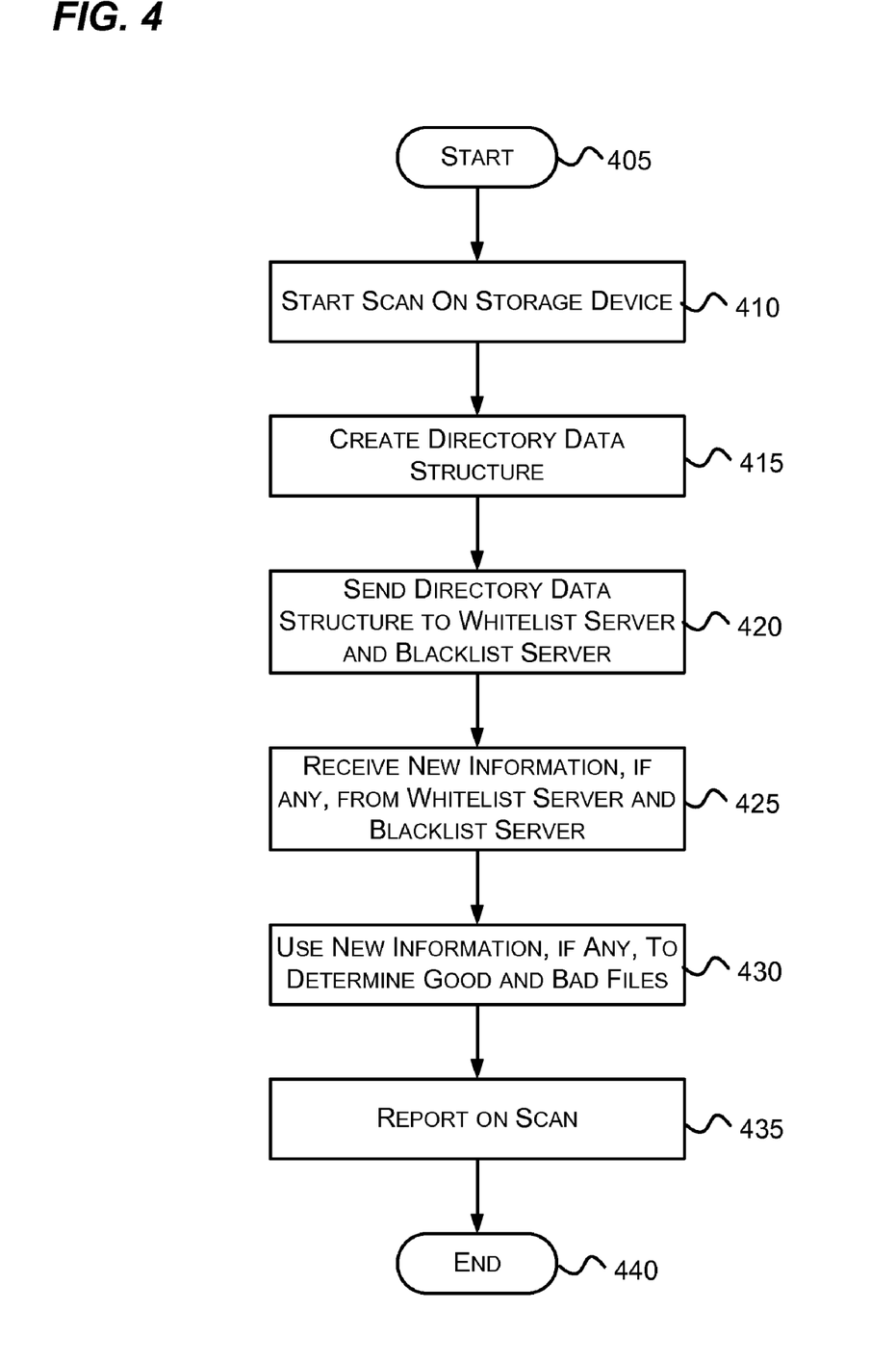
FIG. 4 is a block diagram that generally represents exemplary actions that may occur on a node seeking to identify good and bad files in accordance with aspects of the subject matter described herein.
Figure 5:
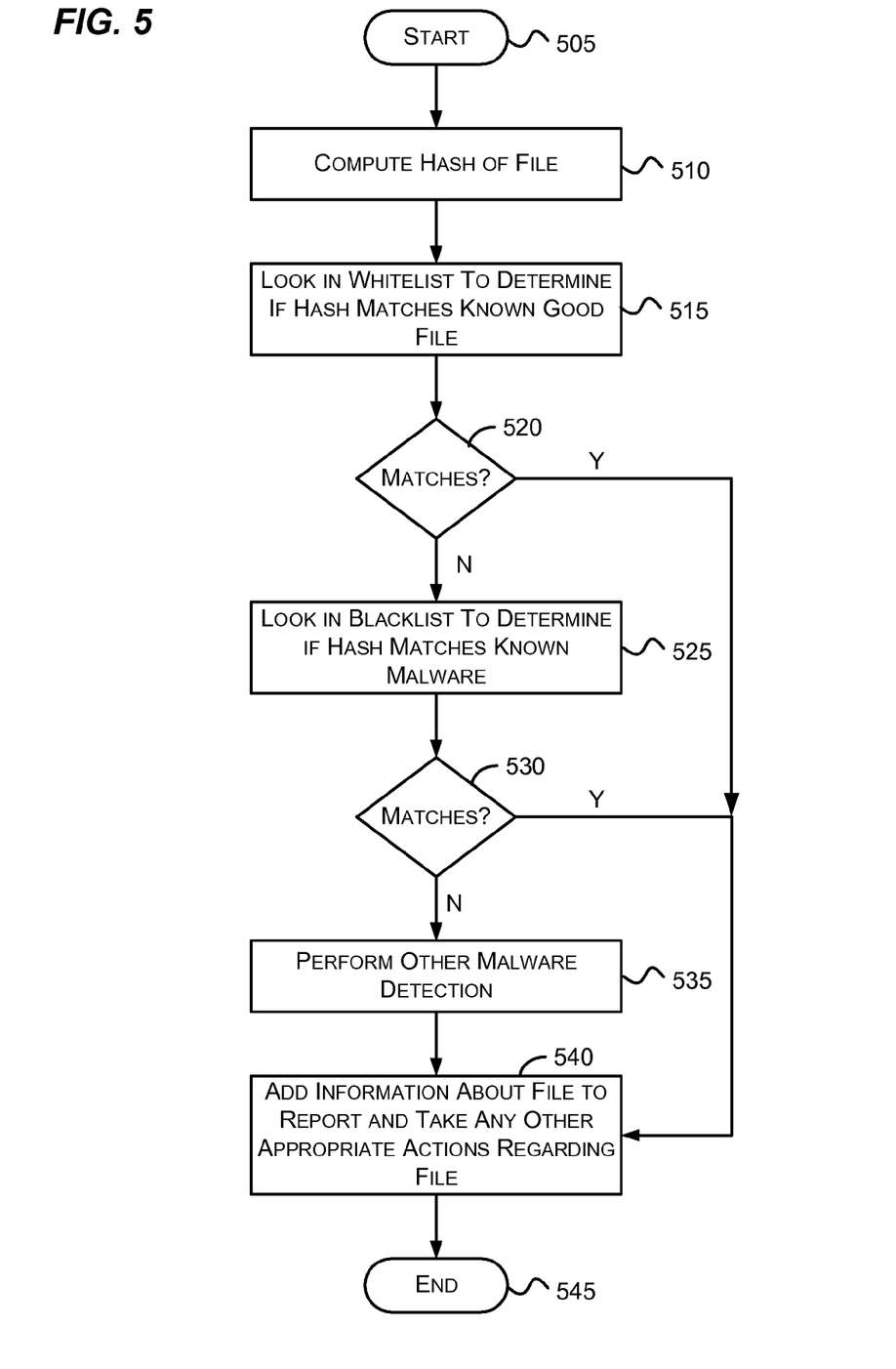
FIG. 5 is a block diagram that generally represents exemplary actions that may occur in determining whether a file is malware in accordance with aspects of the subject matter described herein.
Figure 6:
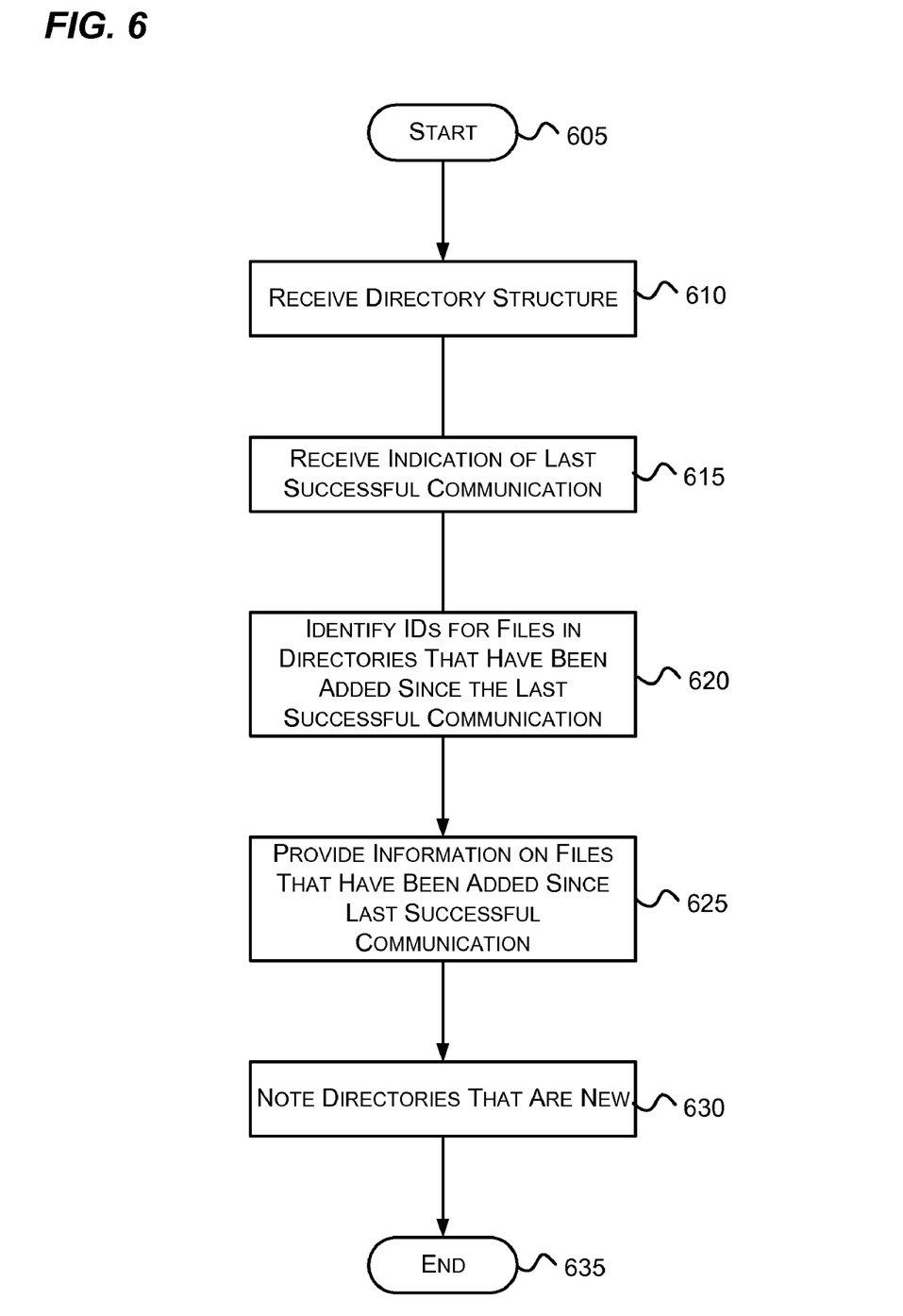
FIG. 6 is a block diagram that generally represents exemplary actions that may occur on a whitelist or blacklist server in connection with a request for information about files in accordance with aspects of the subject matter described herein.

FIGS. 4-6 are flow diagrams that generally represent exemplary actions that may occur in accordance with aspects of the subject matter described herein. For simplicity of explanation, the methodology described in conjunction with FIGS. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a block diagram that generally represents exemplary actions that may occur on a node seeking to identify good and bad files in accordance with aspects of the subject matter described herein. Turning to FIG. 4, at block 405, the actions begin. At block 410, a scan of a storage device begins. For example, referring to FIG. 3, the scanning engine 340 begins scanning the store 335.

At block 415, a data structure that indicates directories on the storage device is created. For example, referring to FIG. 3, the directory structure builder 345 determines which directories are on the store 335 and creates a hierarchical data structure that indicates the directories. This data structure may include the name of each directory together with its relationship to one or more other directories, for example.

At block 420, the data structure is sent to a whitelist server and a blacklist server. For example, referring to FIG. 2, the node 220 sends the directory data structure it just created to the whitelist server 205 and the blacklist server 206. In another embodiment, the data structure may be sent to an intermediate node such as the file identifying proxy 215 or the file identifying proxy 216. In yet another embodiment, a file identifying proxy may send the data structure to the whitelist server 205 and the blacklist server 206. In addition to sending the directory data structure, the node may also send an indication of a last successful communication with the receiving entity.

Note that sending an indication of last successful communication may involve not sending a date or other time information, for example. In another embodiment, sending an indication of last successful communication may include sending information that indicates that the node has never communicated with the server or that this is the first time the node has communicated with the server. In addition, a node may periodically send a "fake" indication that the node has not previously communicated with a server to refresh the node's local database.

At block 425, new information, if any, from the whitelist and blacklist servers is received. The new information may include file information about files that have been added to the whitelist and blacklist for directories in the data structure. For example, referring to FIG. 2, the whitelist server 205 may send file information for new files that have been added since the last successful communication with the node 220. The blacklist server 206 may also send file information for new files that have been added to a blacklist for the indicated directories since the last successful communication with the node 220. Note that the responses from the whitelist server 205 and the blacklist server 206 may be sent at different times.

At block 430, the new information, if any, is used to determine good and bad files. A scan of a file using a whitelist and a blacklist is described in more detail in conjunction with FIG. 5. Note that the new information sent from the whitelist and blacklist servers may be received at any time during or after the scanning process. If the new information is received during the scanning process, it may be used to help identify files from the time it is received. If the new information is received after the scanning process, information, if any, that is already in the node's whitelist and blacklist may be used to help identify files during a current scan and the new information may be used to help identify files during a subsequent scan. If no whitelist and/or blacklist information is included on a node, the scanner may use other malware detection mechanisms to detect malware.

At block 435, a report on the scan is presented. For example, referring to FIG. 3, the scanning engine 340 may compile and present a report to a user regarding the scan of files on the store 335.

At block 440, the actions end.

FIG. 5 is a block diagram that generally represents exemplary actions that may occur in determining whether a file is malware in accordance with aspects of the subject matter described herein. At block 505, the actions begin.

At block 510, a hash of the file is computed. For example, referring to FIG. 3, the scanning engine 340 may compute a hash of a file on the store 335. Some exemplary hashes include Message-Digest algorithm 5 (MD5) and SHA-1 although almost any hash that has few or no collisions for the anticipated files may be used without departing from the spirit or scope of aspects of the subject matter described herein.

At block 515, the scanner looks in the whitelist to determine if the hash matches a designated good file. For example, referring to FIG. 3, the scanning engine 340 uses the hash computed above as an index into the whitelist store 325. If a match is found, and the file is in the appropriate directory, the file is designated to be good.

At block 520, if the hash matches one in the whitelist, the actions continue at block 540; otherwise, the actions continue at block 525.

At block 525, the scanner looks in the blacklist to determine if the hash matches a designated malware. For example, referring to FIG. 3, the scanning engine 340 uses the hash computed above as an index into the blacklist store 330. If a match is found, the file is designated to be malware. It may be that the file needs to be found in a specified directory to be malware. If this is the case, this may be used as a further criterion in determining whether the file matches a file in the blacklist database.

At block 530, if hash matches one in the blacklist, the actions continue at block 540; otherwise, the actions continue at block 535.

In some embodiments, the whitelist and blacklist may be included in a single database. In such embodiments, it may be sufficient to simply index the single database using the hash. If the hash returns a match, the file is known to be on a whitelist or blacklist. In such embodiments, the actions associated with blocks 525 and 530 may be omitted or merged with the actions associated with blocks 515 and 520.

At block 535, other malware detection is performed. For example, referring to FIG. 3, the scanning engine 340 may check various features of a file and perform other actions to determine whether the file includes malware.

At block 540, results about the scan of the file are added to a report and any other appropriate actions regarding the file are taken. For example, if the file is in a whitelist, an identifier of the file may be added to a "good" list. If the file is in a blacklist, an identifier of the file may be added to a "bad" list and the file may be quarantined, for example. If the scanning engine is not able to find the file on a whitelist or a blacklist, but the scanning engine determines that the file includes malware, the file may be quarantined or repaired, for example.

At block 545, the actions end. The actions described above in conjunction with FIG. 5 may be repeated for each file to be scanned. If a whitelist does not exist on the local node, the actions associated with blocks 515-525 may be skipped. If a blacklist does not exist on the local node, the actions associated with blocks 525-530 may be skipped.

FIG. 6 is a block diagram that generally represents exemplary actions that may occur on a whitelist or blacklist server in connection with a request for information about files in accordance with aspects of the subject matter described herein. At block 605, the actions begin.

At block 610, a directory structure is received. For example, referring to FIG. 2, the whitelist server 205 receives a directory structure from the node 221. The directory structure may include a directory such as \Program Files, for example.

At block 615, an indication of the last successful communication is received. The indication may be received in conjunction with (e.g., in the same request or communication) receiving the directory structure or may be received separate from receiving the data structure. For example, referring to FIG. 2, the node 221 may indicate that the last time it received information about the \Program Files directory was 5 days ago.

At block 620, the server identifies identifiers for files in directories that have been added since the last successful communication. For example, referring to FIG. 2, the whitelist server 205 may determine the files that have been added since five days ago.

At block 625, information on the files that have been added since the last successful communication is sent. For example, referring to FIG. 2, if information for a file named "NEW-FILE" was added to the directory \Program Files during the last five days, this information would be sent to the node 221.

At block 630, directories that are new to the server are noted. For example, referring to FIG. 2, if the node 221 sent a directory that was not included in the whitelist server 205's whitelist, the whitelist server 205 may note how many times the directory has been sent. If the number of times is greater than or equal to a threshold, the whitelist server 205 may request that the node 221 send information about the files in the directory.

At block 635, the actions end.

As can be seen from the foregoing detailed description, aspects have been described related to identifying good files and malware based on whitelists and blacklists. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium, the computer storage medium not consisting of a propagating signal, the computer storage medium having computer-executable instructions, which when executed perform actions, comprising:

starting a scan of files to identify files included on a storage device of a node as good or malware;

in conjunction with starting the scan to identify files included on the storage device of the node as good or malware, creating a data structure that indicates directories included on the storage device, the data structure further indicating a hierarchy of the directories, a date and timestamp for a creation of each directory;

sending, by the node, the created data structure to a first server and an indication of a last successful communication with the first server;

receiving, by the node, information from the first server for files that have been added to the at least one directory after the last successful communication with the first server;

using the information to determine whether a file stored on the storage device is designated as good or malware by:

computing a hash of the file stored on the storage device;

comparing a directory in which the file resides to a directory that the information from the first server indicates includes the file;

sending the hash of the file to a proxy and receiving a response from the proxy as to whether the file is designated as good or malware;

if the computed hash of the file is equal to a hash included in the information from the first server and the file is found in a directory that the information from the first server indicates includes the file, determining that the file is designated as good, wherein the creating a data structure that indicates at least one directory included on the storage device, the sending the data structure to a first server and an indication of a last successful communication with the first server, and the receiving information for files that have been added to the at least one directory after the last successful communication with the first server are performed by the proxy.

2. The computer storage medium of claim 1, further comprising sending the data structure to a second server and an indication of a last successful communication with the second server, the second server including information about files that are designated as malware.

3. The computer storage medium of claim 1, wherein the information comprises an identifier of a file.

4. The computer storage medium of claim 3, wherein the identifier is calculated by computing a hash of the file.

5. The computer storage medium of claim 1, wherein using the information to determine whether a file stored on the storage device is designated as good or malware comprises:
   receiving, at a proxy, a hash of the file stored on the storage device, the hash being computed by a node;
   comparing the hash of the file to a hash included in the information received from the first server; and
   sending, to the node, an indication of whether the file is designated as good or malware.

6. The computer storage medium of claim 1, wherein the malware comprises computer code designed to infiltrate a computer system.

7. The computer storage medium of claim 6, wherein the computer code comprises one or more of a virus, worm, Trojan horse, and adware.

8. The computer storage medium of claim 1, further comprising continuing the scan while waiting to receive the information, the scan using previously received information to determine whether one or more of the files are designated as good or malware.

9. A method implemented at least in part by a computer, the method comprising:
   using a processing unit starting a scan of files to identify files included on a storage device of a node as good or malware;
   in conjunction with starting the scan to identify files included on the storage device of the node as good or malware, creating a data structure that indicates directories included on the storage device, the data structure further indicating a hierarchy of the directories, a date and timestamp for a creation of each directory;
   sending, by the node, the created data structure to a first server and an indication of a last successful communication with the first server;
   receiving, by the node, information from the first server for files that have been added to the at least one directory after the last successful communication with the first server;
   using the information to determine whether a file stored on the storage device is designated as good or malware by:
   computing a hash of the file stored on the storage device;
   comparing a directory in which the file resides to a directory that the information from the first server indicates includes the file;
   sending the hash of the file to a proxy and receiving a response from the proxy as to whether the file is designated as good or malware;
   if the computed hash of the file is equal to a hash included in the information from the first server and the file is found in a directory that the information from the first server indicates includes the file, determining that the file is designated as good, wherein the creating a data structure that indicates at least one directory included on the storage device, the sending the data structure to a first server and an indication of a last successful communication with the first server, and the receiving information for files that have been added to the at least one directory after the last successful communication with the first server are performed by the proxy.

* * * * *